United States Patent [19]

Nagasaki et al.

[11] Patent Number: 5,386,410
[45] Date of Patent: Jan. 31, 1995

[54] OPTICAL RECORDING MEDIUM AND RECORDING AND REPRODUCING APPARATUS OF THE SAME

[75] Inventors: Tatsuo Nagasaki; Yutaka Adachi, both of Hachioji, Japan

[73] Assignee: Olympus Optical Co., Ltd., Tokyo, Japan

[21] Appl. No.: 100,064

[22] Filed: Jul. 30, 1993

Related U.S. Application Data

[63] Continuation of Ser. No. 710,675, Jun. 5, 1991, abandoned.

[30] Foreign Application Priority Data

Jun. 12, 1990 [JP] Japan ................. 2-153575

[51] Int. Cl.⁶ ........................................... G11B 3/70
[52] U.S. Cl. .................... 369/275.4; 369/109; 369/111
[58] Field of Search ............... 369/44.11, 44.23, 44.34, 369/44.37, 44.41, 44.42, 109, 110, 111, 112, 124, 48, 122, 275.3, 275.4

[56] References Cited

U.S. PATENT DOCUMENTS

| | | | |
|---|---|---|---|
| 4,287,413 | 9/1981 | Kanamaru | 369/112 |
| 4,359,750 | 11/1982 | Howe | 369/275.4 |
| 4,507,763 | 3/1985 | Kato | 369/275.4 |
| 4,507,772 | 3/1985 | Yamamoto | 369/109 |
| 4,634,850 | 1/1987 | Pierce et al. | 369/32 |
| 4,929,822 | 5/1990 | Nakamura et al. | 369/44.37 |
| 4,963,464 | 10/1990 | Setani | 369/275.3 |
| 4,987,301 | 1/1991 | Nakamura | 369/44.37 |
| 5,025,438 | 6/1991 | Emoto | 369/122 |
| 5,034,940 | 7/1991 | Saito et al. | 369/124 |
| 5,056,080 | 10/1991 | Russell | 369/109 |

FOREIGN PATENT DOCUMENTS

| | | |
|---|---|---|
| 0245511 | 11/1987 | European Pat. Off. . |
| 0350336 | 1/1990 | European Pat. Off. ......... 369/44.37 |
| 3545996 | 7/1986 | Germany . |
| 3724622 | 1/1988 | Germany . |
| 3741910 | 6/1988 | Germany . |
| 3837745 | 5/1989 | Germany . |
| 59-207433 | 11/1984 | Japan . |
| 63-58627 | 3/1988 | Japan . |

*Primary Examiner*—Aristotelis Psitos
*Assistant Examiner*—Nabil Hindi
*Attorney, Agent, or Firm*—Frishauf, Holtz, Goodman & Woodward

[57] ABSTRACT

A recording and reproducing apparatus of an optical recording medium has a plurality of light sources. A plurality of light beams are radiated by a laser diode array to a track of the optical recording medium, and each of the plurality of light beams reflected by the track is detected by a photodiode and converted into an electrical signal. The laser diode array is arranged such that the beam spots of adjacent ones of the plurality of light beams cross a track direction of the optical recording medium and a track width direction perpendicular to the track direction. The signal detected by the photodiode is converted into an electrical signal and recorded in a frame memory as data corresponding to the signal. The digital data stored in the frame memory is read out by a two-dimensional decoder.

3 Claims, 10 Drawing Sheets

| G2 | g2 | G3 | g3 | G4 | g4 | G5 | g5 | G6 | g6 | G7 | g7 | G1 | g1 |
|----|----|----|----|----|----|----|----|----|----|----|----|----|----|
| F3 | f3 | F4 | f4 | F5 | f5 | F6 | f6 | F7 | f7 | F1 | f1 | F2 | f2 |
| E4 | e4 | E5 | e5 | E6 | e6 | E7 | e7 | E1 | e1 | E2 | e2 | E3 | e3 |
| D5 | d5 | D6 | d6 | D7 | d7 | D1 | d1 | D2 | d2 | D3 | d3 | D4 | d4 |
| C6 | c6 | C7 | c7 | C1 | c1 | C2 | c2 | C3 | c3 | C4 | c4 | C5 | c5 |
| B7 | b7 | B1 | b1 | B2 | b2 | B3 | b3 | B4 | b4 | B5 | b5 | B6 | b6 |
| A1 | a1 | A2 | a2 | A3 | a3 | A4 | a4 | A5 | a5 | A6 | a6 | A7 | a7 |

OPTICAL RECORDING MEDIUM AND RECORDING AND REPRODUCING APPARATUS OF THE SAME

This application is a continuation of application Ser. No. 07/710,675, filed Jun. 5, 1991 now abandoned.

BACKGROUND OF THE INVENTION

1. Field of the Invention

The present invention relates to an optical recording medium and a recording and reproducing apparatus of the same and, more particularly, to an optical recording medium on which data multi-value recording is performed and a recording and reproducing apparatus of the same.

2. Description of the Related Art

Recently, a recording and reproducing apparatus (e.g., an optical disk apparatus) which uses an optical recording medium has begun to be used as a large-capacity data recording apparatus. For example, in this optical recording apparatus, a light beam emitted by a laser optical source arranged above an optical disk as an optical recording medium is focused as incident light by a polarization beam splitter, an objective lens, and the like, and irradiates a track of the optical disk. Light reflected by the optical disk is directed to the polarization beam splitter to be separated from the incident light, and supplied to a photodetector such as a photodiode. An optical signal from the polarization beam splitter is converted by the photodetector into an electrical signal and amplified. Then, data written on the track of the optical disk is read out as recorded data through a sample and hold circuit, a digitizer, a decoder, and the like.

In such an optical disk apparatus, data to be recorded on a track of an optical disk, i.e., recording pits are usually arranged along the track direction in a one-dimensional manner. For this reason, the recording pits are formed at desired intervals. However, this imposes a limit in obtaining higher density data recording.

SUMMARY OF THE INVENTION

It is, therefore, an object of the present invention to provide a high-density optical data recording medium by using the pit size realized by a conventional recording and reproducing apparatus, and a recording and reproducing apparatus of the same.

According to an aspect of the present invention, there is provided an optical recording medium comprising a plurality of tracks, formed at a predetermined interval, for writing data therein, and a plurality of guide tracks, formed between the plurality of tracks, for writing data therein, wherein a pit as coded data is formed in at least one of a track direction and a track width direction perpendicular to the track direction by modulating at least one of a pit length, an interpit distance, and a distance between the guide track and the pit.

According to another aspect of the present invention, there is provided a recording and reproducing apparatus of an optical recording medium, comprising light beam radiating means having a plurality of light sources for radiating a plurality of light beams to the optical recording medium, photodetecting means for detecting the plurality of light beams reflected by the optical recording medium and converting the detected light beams into electrical signals, memory means for recording data corresponding to the signal detected by the photodetecting means, and decoding means for reading out the signal stored in the memory means and decoding the coded data, wherein the plurality of light sources of the light beam radiating means are arranged such that beam spot positions of adjacent ones of the plurality of light beams cross a track direction of the optical recording medium and a track width direction perpendicular to the track direction.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

According to the present invention, sampling is performed in a track direction and a track width direction perpendicular to the track direction in a two-dimensional manner at a sampling pitch satisfying a sampling theorem, and the intensity of light reflected by a sampling point is monitored. If a pit exists, the intensity of the light reflected by the optical recording medium changes due to phenomena such as diffraction. Hence, the reflected light intensity reflects the presence/absence of a pit. The intensity of the light, in each of the two-dimensional directions, reflected by the optical recording medium and sampled in the two-dimensional directions at the sampling pitch described above, is filtered through a low-pass filter (LPF). As a result, the light intensity of each of the two-dimensional directions is modulated to a distance, and two-dimensional position data of multi-value recorded pits is obtained.

Since this position data is obtained by a method satisfying the sampling theorem, it precisely reproduces the two-dimensional position of a pit. More specifically, in the present invention, a pit position is detected without using a line sensor and the like as a detecting system. Therefore, a detection resolution can be increased and the number of multi-value recording steps can be decreased independently of a resolution of a detector or the number of detectors.

With a recording and reproducing apparatus of an optical recording medium, assume that a plurality of light sources are sequentially turned on one at a time as the light beam radiating means. In this case, the arrangement pitch of the light sources in the track direction of the optical recording medium is set to satisfy the following relation:

$$Px < \frac{1}{2} W \left( l \pm \frac{1}{n} \right) \tag{1}$$

where Px is the arrangement pitch of the light beam sources in the track direction of the optical recording medium, W is the minimum repetition cycle of the data recording pits in the track direction, n is the number of the plurality of light sources, and l is a natural number. The second term ±W/2n of inequality (1) is to correct the distance of the moving medium as the light sources are sequentially turned on. The sign is determined by the moving direction of the medium. When the plurality of light sources are turned on simultaneously, the above relation may be:

$$Px < \frac{1}{2} W \tag{2}$$

When the arrangement pitch of the light beam sources in a direction perpendicular to the track direction is Py, Py is set to satisfy the following relation:

$$Py < \frac{T+a}{2} \tag{3}$$

where a is the pitch width size in a direction perpendicular to the track direction and T is the light beam spot length (spot type) in the direction perpendicular to the track direction. Since condition T>a is generally satisfied, the plurality of light sources may be arranged such that spots are formed on the medium to satisfy the following relation:

$$Py < T/2 \tag{4}$$

Figure 1A:
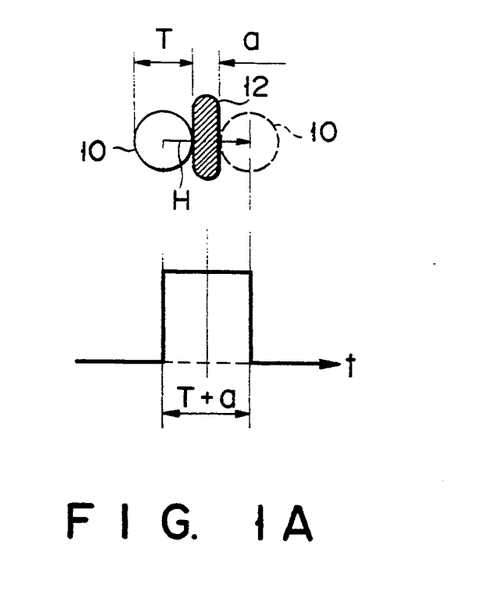
FIG. 1A shows a moving spot reflection intensity of an optical recording medium and a recording and reproducing apparatus of the present invention.
Figure 1B:
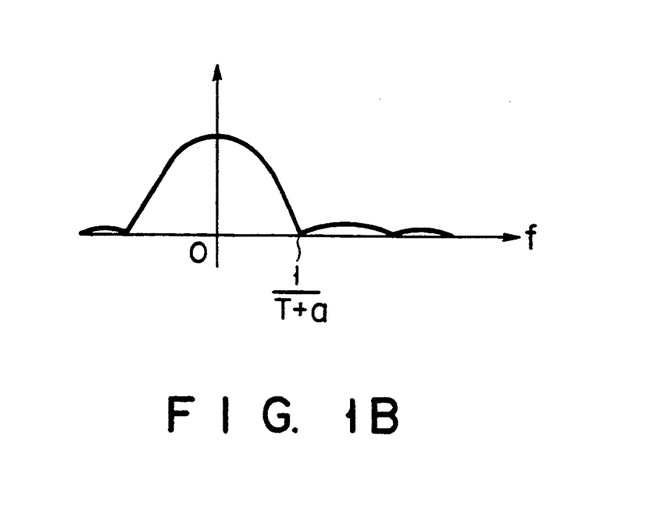
FIG. 1B shows a relationship between the reflection intensity and a band.

FIGS. 1A and 1B will be described. First, when a spot 10 moves in the direction of an arrow H in FIG. 1A to cross a pit 12, the reflected light intensity of the moving spot on a time base is indicated as in FIG. 1A. Of the reflected light intensity, a function having a widest band is a rectangle function having a width of T+a. Its band is as shown in FIG. 1B, and a first zero-crossing point is 1/(T+a). This band is the data recording band in a direction perpendicular to the track direction. Thus, the sampling pitch for correctly reproducing this band becomes as indicated by inequality (3) from the sampling theorem.

In the recording and reproducing apparatus of the optical recording medium, when a single light source is moved as the light beam irradiating means, a sampling pitch SPx in the track direction of the optical recording medium is set to satisfy:

$$SPx < W/2 \tag{5}$$

in order to satisfy the sampling theorem. A sampling pitch SPy in the direction perpendicular to the track direction is set to satisfy:

$$SPy < \frac{T+a}{2} \tag{6}$$

An embodiment of the present invention will be described with reference to the accompanying drawings.

Figure 2:
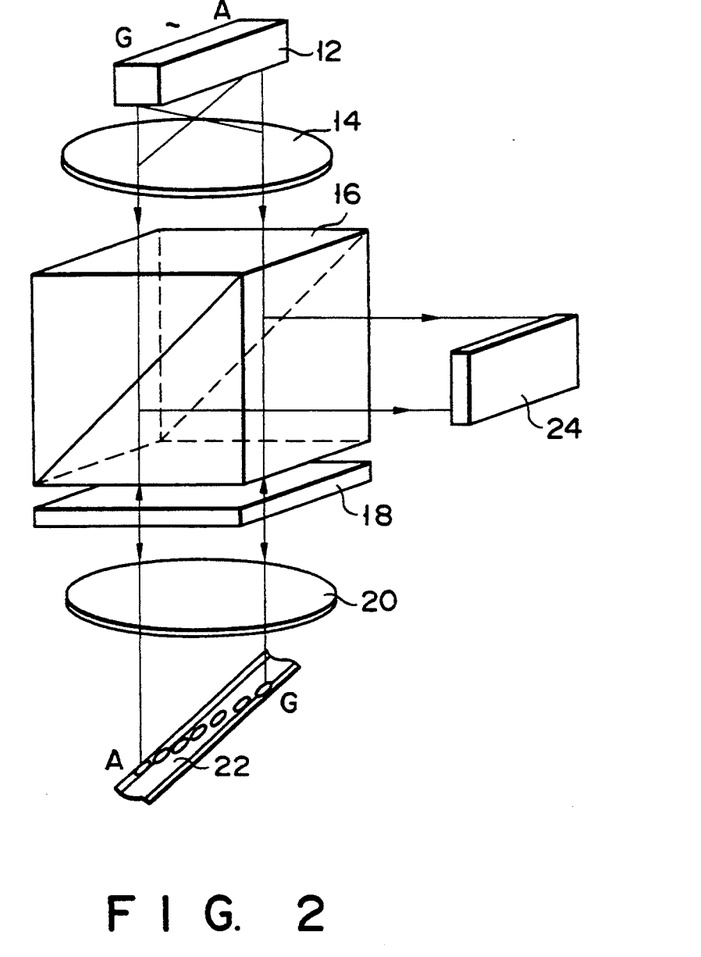
FIG. 2 schematically shows an optical system of a recording and reproducing apparatus of an optical recording medium according to the first embodiment of the present invention.
Figure 3:
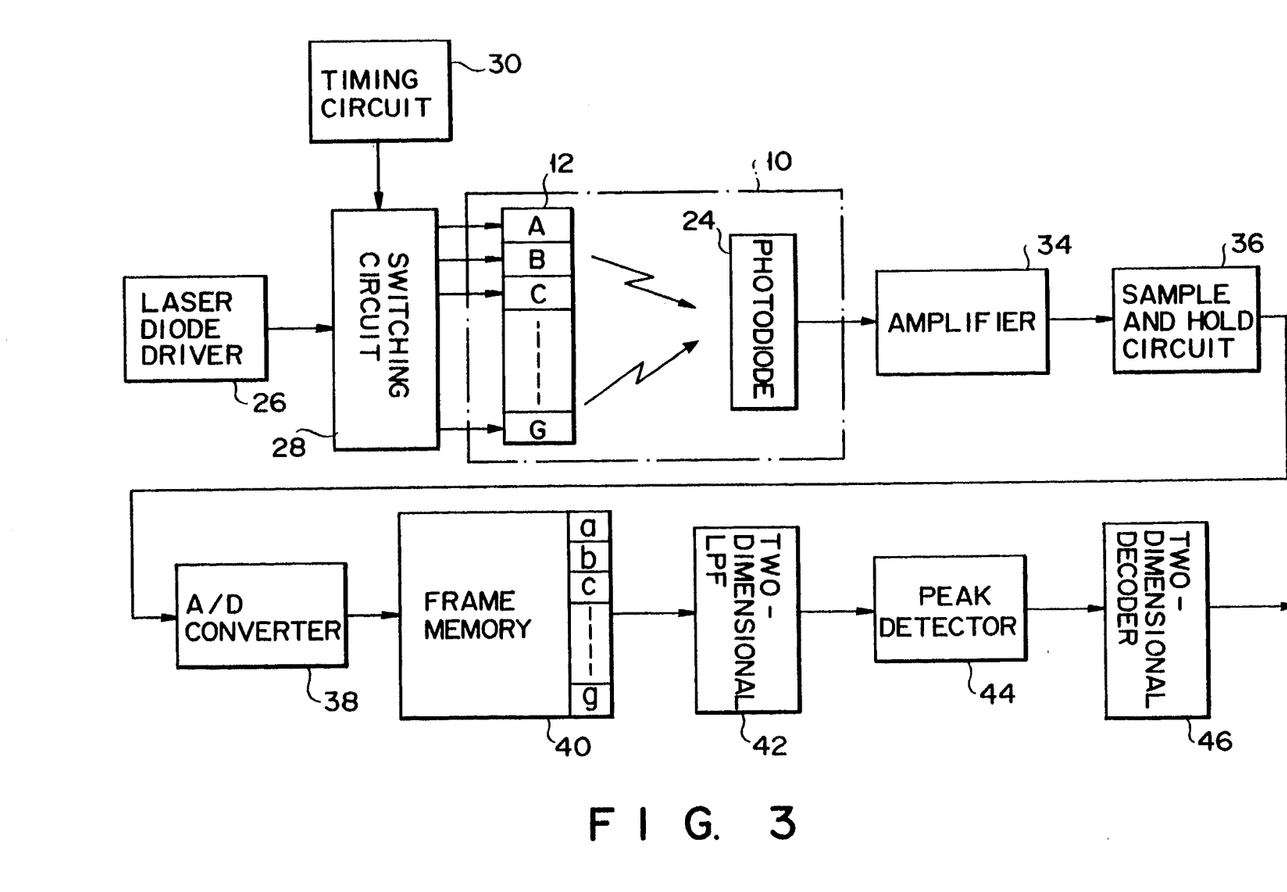
FIG. 3 is a block diagram of the main part of the recording and reproducing apparatus of the optical recording medium.

FIG. 2 schematically shows an optical system of a recording and reproducing apparatus of an optical recording medium according to the present invention, and FIG. 3 is a block diagram of the main part of the recording and reproducing apparatus of the optical recording medium. The optical system of the recording and reproducing apparatus of the optical recording medium will be described. A light beam emitted by a laser diode array 12 is directed as incident light to a polarization beam splitter through a collimator lens 14. The incident light is focused by a λ/4 plate 18 and an objective lens 20 and irradiates the optical recording medium having a plurality of tracks, e.g., a desired track 22 of an optical disk.

Light reflected by the track 22 is directed to the polarization beam splitter 16 through the objective lens 20 and the λ/4 plate 18. The reflected light is separated from the incident light by the polarization beam splitter 16 and is sent to a photodiode 24 as a photodetector.

In the recording and reproducing apparatus, an output from a laser diode driver 26 is supplied to a switch circuit 28. The switch circuit 28 performs switching in response to a timing pulse supplied from a timing circuit 30 and outputs a driver output to the laser diode array 12. The light beam emitted from the laser diode array 12 is output to the photodiode 24 through the path of FIG. 2 described above.

An output from the photodiode 24 is amplified by an amplifier 34, passes a sample and hold circuit 36, and is output to an A/D converter 38. A digital output from the A/D converter 38 is stored in a frame memory 40. Data read out from the frame memory 40 is output from a two-dimensional decoder 46 through a two-dimensional low-pass filter (LPF) 42 and a peak detector 44.

The operation of this embodiment will be described.

Figure 4:
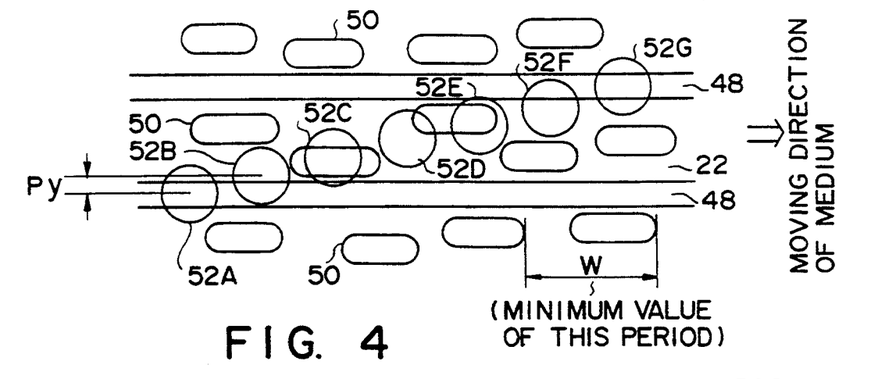
FIG. 4 schematically shows a track of the optical recording medium.

FIG. 4 schematically shows the track 22 of the optical recording medium described above, i.e., the optical disk. Guide tracks 48 are formed on two sides of the track 22 in the track direction, and a plurality of recording pits 50 are formed at a predetermined interval. The recording pits 50 are recorded as different data depending on their positions with respect to the track 22. These recording pits 50 are read when the laser diode array 12 scans them in the track direction and a direction perpendicular to the track direction in a two-dimensional manner.

The laser diode array 12 is driven by the laser diode driver 26. For example, laser diodes A, B, C, ..., G in FIG. 3 of the laser diode array 12 are switched in response to predetermined timing pulses supplied from the timing circuit 30. The laser diode array 12 sequentially turned on by the timing pulses obliquely irradiates and scans the desired track 22 through the collimator lens 14, the polarization beam splitter 16, the λ/4 plate 18, and the objective lens 20. In other words, e.g., spots 52A, 52B, 52C, 52D, 52E, 52F, and 52G in FIG. 4 obliquely irradiate the track 22 and the guide tracks 48.

The arrangement of the laser diode array 12 corresponding to the respective spots 52A to 52G will be described.

The arrangement of the laser diode array 12 must be set as follows in accordance with the known sampling theorem in order to reproduce the light reflected by a recording pit 50 on the track 22 by the two-dimensional LPF 42. More specifically, the pitch Py in the direction perpendicular to the track direction is set to ½ or less that of the light beam spot system. A cycle for re-exciting a single laser diode (e.g., the laser diode A of the laser diode array 12 of FIG. 3) must be set shorter than a time required for a detection head of an optical system 10 to move ½ the minimum repetition cycle W of the recording pit 50.

More specifically, the arrangement pitch (Px) of the laser diode array 12 in the track direction must be set to satisfy the following relation:

$$Px < \frac{1}{2} W \left( l - \frac{1}{n} \right)$$

where W is the minimum repetition cycle of the data recording pits in the track direction, n is the number of arrays, and l is a natural number, by considering the shift amount of the head of the optical system 10 in the track direction such that the detection data can be stored in a corresponding area in the frame memory 40.

The arrangement of the laser diode array 12 for obliquely radiating the light beam to the track and the guide tracks 48 is thus determined. Note that if the medium moves in a direction opposite to its moving direction shown in FIG. 4, Px must satisfy:

$$Px < \frac{1}{2} W \left( l + \frac{1}{n} \right)$$

Figure 5A:
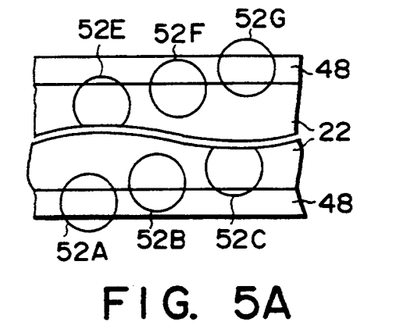
FIGS. 5A and 5B respectively show on- and off-track states.
Figure 5B:
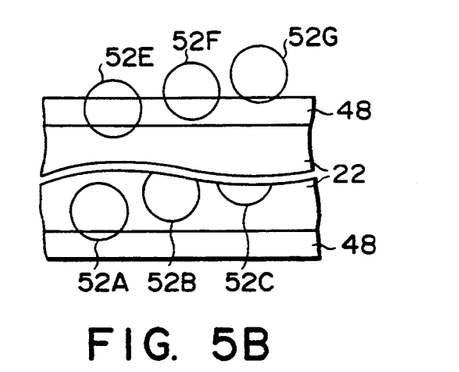

FIGS. 5A and 5B show a state in which the laser diode array 12 appropriately irradiates the track 22 and the guide tracks 48 and a state in which it does not, respectively, i.e., on- and off-track states. More specifically, the discrimination between on- and off-track states can be made depending on which one of the spots 52A to 52G corresponding to the laser diode array 12 a guide track 48 crosses. If it is discriminated to be the off-track state, correction is performed by a servo system (not shown) to obtain the on-track state.

Data of a recording pit 50 scanned by the spots 52A to 52G is received by the photodiode 24 through the objective lens 20, the λ/4 plate 18, and the polarization beam splitter 16. The photodiode 24 receives light sequentially reflected by the spots 52A to 52G corresponding to the respective laser diodes A to G of the laser diode array 12. When optical data is converted into an electrical signal by the photodiode 24, it is then amplified by the amplifier 34 as a reproduced signal. Then, the reproduced signal passes the sample and hold circuit 36, is converted into a digital signal by the A/D converter 38, and is stored in the frame memory 40.

Figure 6:
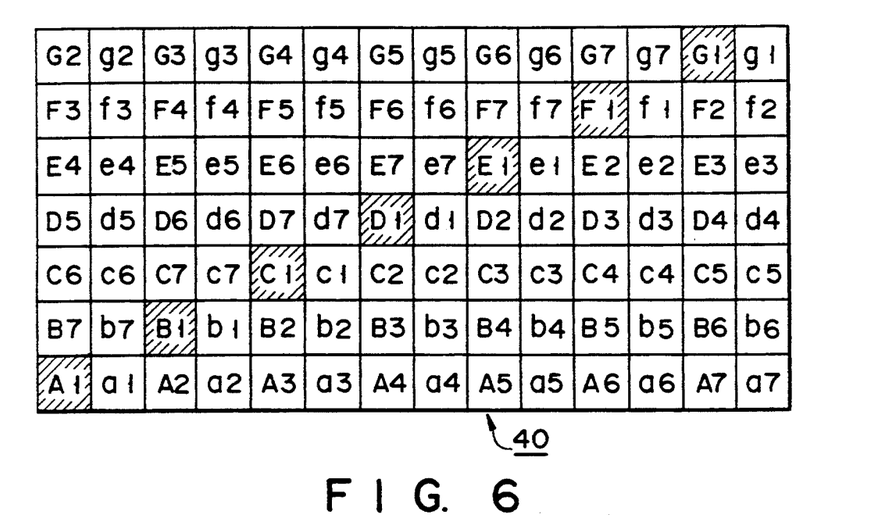
FIG. 6 is a table showing the memory content of a frame memory of FIG. 3.
Figure 7:
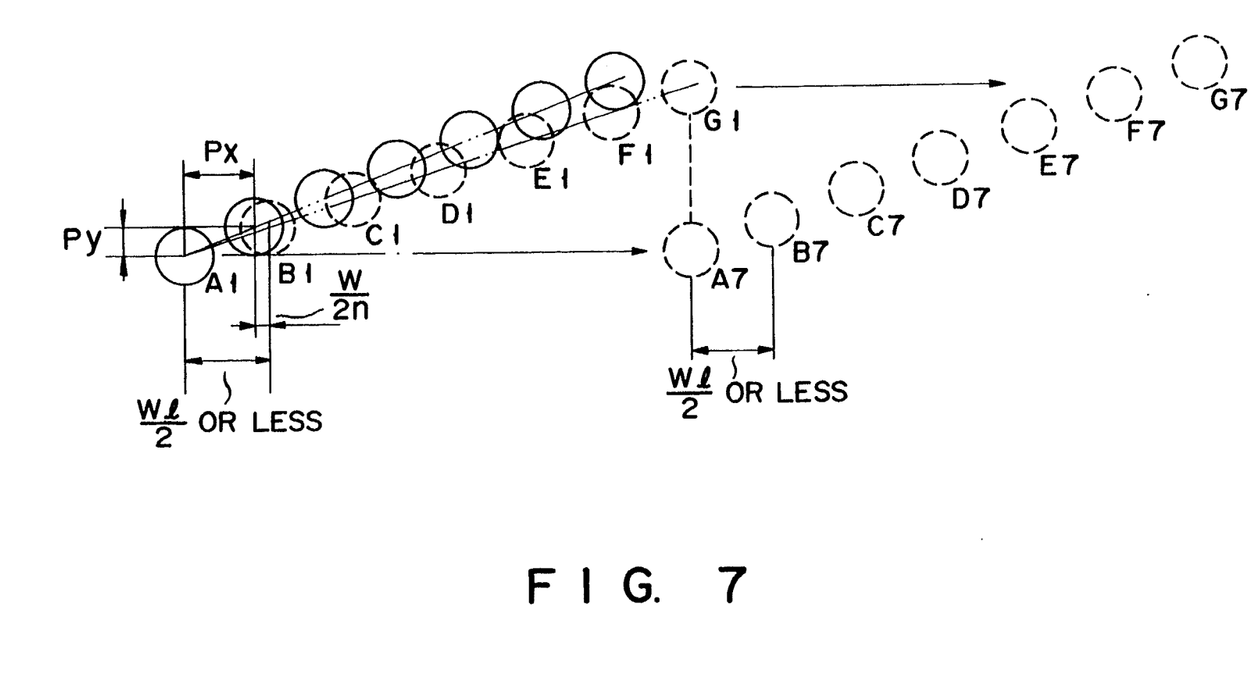
FIG. 7 shows a state in which spots sequentially irradiate a track of an optical recording medium.

FIG. 6 shows an example of the memory content of the frame memory 24 when the spots are sequentially radiated to perform sampling, as shown in FIG. 4. The frame memory 24 is, e.g., a 7×14 byte memory. Referring to FIG. 7, circles indicated by solid lines show the arrangement positions of the laser diodes for forming the spots 52A to 52G as shown in FIG. 4. Circles indicated by broken lines show the positions of the spots obtained by sequentially turning on the laser diodes. The spot positions represent shift amounts upon movement of the medium.

More specifically, the circles indicated by the broken lines correspond to the spots 52A to 52G of FIG. 4. The centers of the spots G1 and A7 are located on a line in the same track width direction. In this example, n=7 and l=2. When the spots 52A to 52G read data as shown in FIG. 4, the data are written at A1, C1, ..., and G1 (hatched portions) of the frame memory 40 shown in FIG. 6. Subsequently, when the laser diode array 12 is moved, the data are written at a1, b1, c1, ..., and g1.

The reproduced signal read out from the frame memory 40 in the longitudinal direction of the memory is processed by the two-dimensional LPF 42 and the peak detector 44 to detect the two-dimensional peak position of the recording pit 50. Then, the reproduced signal is decoded by the two-dimensional decoder 46 and is derived as recorded data through an error correction circuit and the like (not shown).

The two-dimensional LPF 42 comprises a two-dimensional convolution filter and also serves as a waveform equalizer.

In this manner, the recording pits arranged in a two-dimensional manner are scanned in the two directions, i.e., the track direction and the direction perpendicular to it, and multi-value recording is performed within a range where a predetermined C/N (error rate) can be ensured. As a result, the recording density can be largely improved, and recording and reproduction can be correctly performed.

Figure 8:
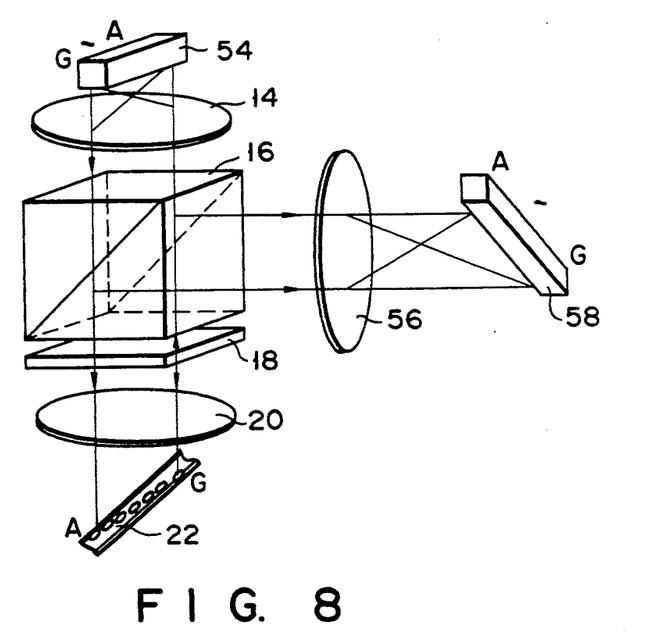
FIG. 8 schematically shows an optical system of a recording and reproducing apparatus of an optical recording medium according to the second embodiment of the present invention.
Figure 9:
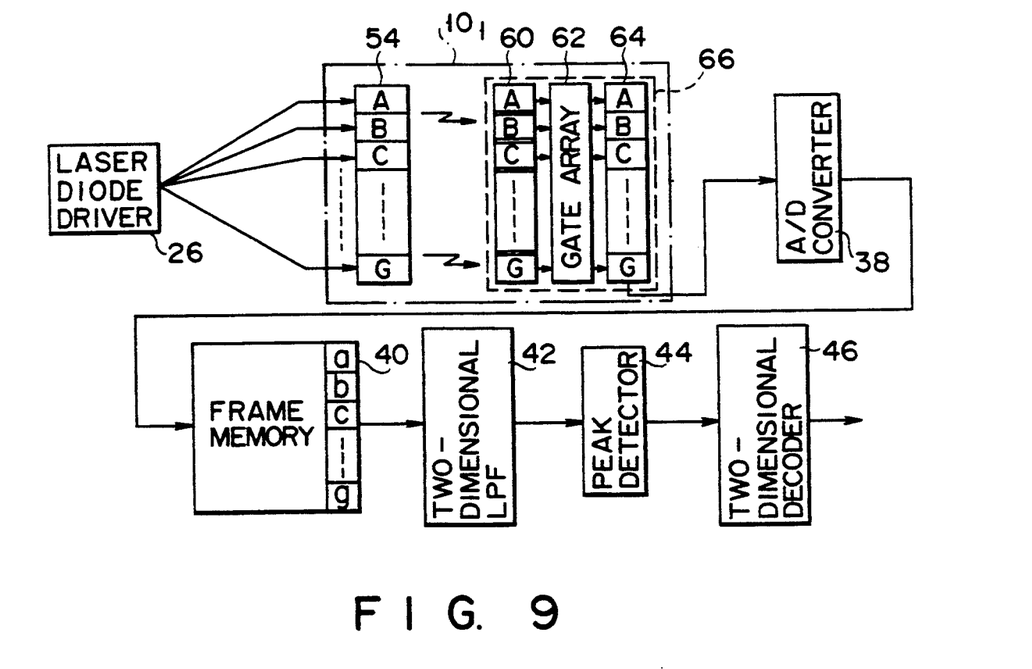
FIG. 9 is a block diagram of the main part of the recording and reproducing apparatus of the optical recording medium which adopts the optical system of FIG. 8.
Figure 10:
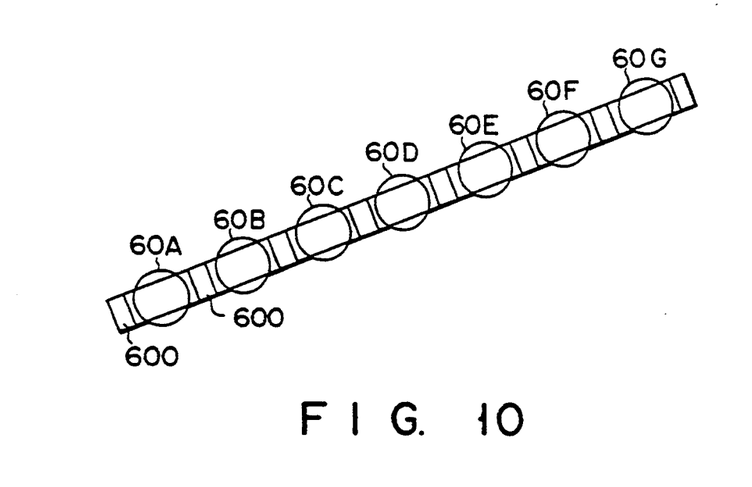
FIG. 10 shows an image-forming state on the surface of a photodiode array of FIG. 8.

FIGS. 8 through 10 show the second embodiment of the present invention. FIG. 8 schematically shows an optical system of a recording and reproducing apparatus of an optical recording medium according to the second embodiment of the present invention. FIG. 9 is a block diagram of the main part of the recording and reproducing apparatus of the optical recording medium. FIG. 10 shows an image-forming state on the surface of a photodiode array of FIG. 8. In this embodiment, the same portions as in the first embodiment described above are denoted by the same reference numerals and a detailed description thereof will be omitted to avoid redundancy.

The optical system of the recording and reproducing apparatus of the optical recording medium shown in FIG. 8 will be described. A laser diode array 54 so positioned as to obliquely scan a track 22 emits a plurality of light beams at once. The light beams as the incident light irradiate the desired track 22 of the optical disk through a collimator lens 14, a polarization beam splitter 16, a λ/4 plate 18, and an objective lens 20. Light reflected by the track 22 is directed to the polarization beam splitter 16 through the objective lens 20 and the λ/4 plate 18, is separated from the incident light, and forms an image on a detector array 58 through an image-forming lens 56.

The detector array 58 comprises, e.g., a linear array CCD 66 having a photodiode array 60, a gate array 62, and a shift register 64 as a transfer element, as indicated in an optical system $10_1$ of FIG. 9.

FIG. 10 shows an image-forming state on the photodiode array 60 of the linear array CCD 66. Images 60A, 60B, 60C, 60D, 60E, 60F, and 60G are formed between a plurality of dead zones 600.

When CCD transfer is performed by the linear array CCD 66, the light beams can be read as time signals. As the laser diodes are turned on at once, no switching circuit 28 or a timing circuit 30 is required. A signal read from the linear array CCD 66 is converted into a digital signal by an A/D converter 38 in the same manner as in the first embodiment described above, and is stored in a frame memory 40. A reproduced signal read out from the frame memory 40 is sent to a two-dimensional LPF 42 and a peak detector 44 so that the two-dimensional peak position of a recording pit 50 is detected. Then, the reproduced signal is decoded by a two-dimensional decoder 46.

The laser diode array 54 can be of a type that converts a beam of a single laser diode into a rectangular beam by a cylindrical lens.

In the above embodiment of the present invention, tracking servo is performed. A case in which tracking servo is not performed will be described.

When, e.g., a disk medium is used as the optical recording medium, eccentricity of about several tens of tracks usually occurs in the recording tracks with respect to the center of rotation. For this reason, the number of spots 52A to 52G shown in FIG. 4 is increased to cover the eccentricity amount of several tens of tracks. The number of elements of the photodiode array 58 is also increased accordingly.

The memory capacity of the frame memory 40 of FIG. 9 is increased to cope with the increased number of elements. Then, the position data on the recording pits 50 and the guide tracks 48 of several tens of tracks is stored in the frame memory 40. As a result, tracking can be performed by reading out the position data on the recording pits 50 while electronically tracking the guide tracks 48 in the frame memory 40 without performing mechanical tracking. As electronic tracking is used, mechanical tracking becomes unnecessary, and the size and weight of the detection head can be decreased.

Figure 11:
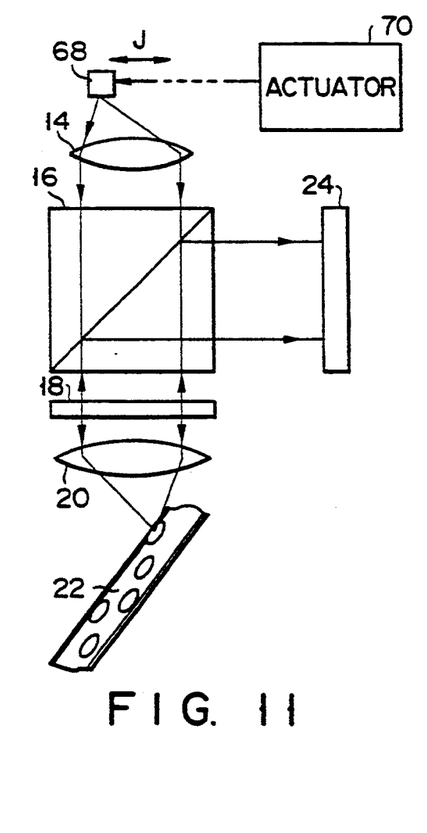
FIG. 11 schematically shows an optical system of a recording and reproducing apparatus of an optical recording medium according to the third embodiment of the present invention.
Figure 12:
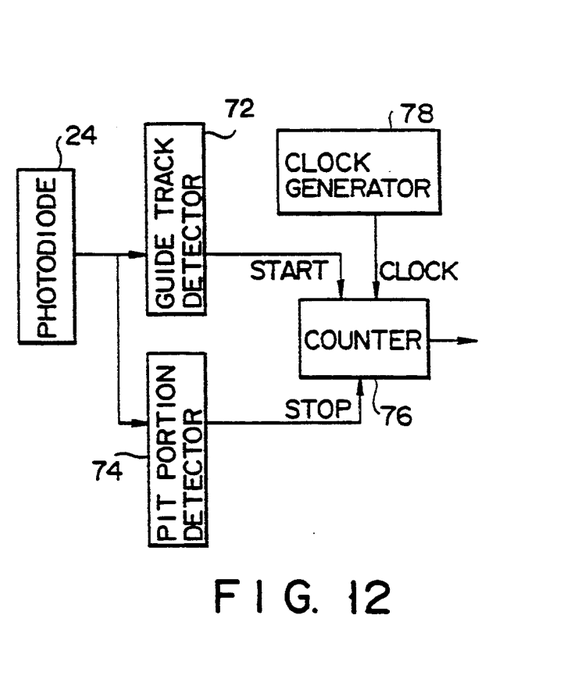
FIG. 12 is a block diagram of the main part of the recording and reproducing apparatus of the optical recording medium which adopts the optical system of FIG. 11.
Figure 13:
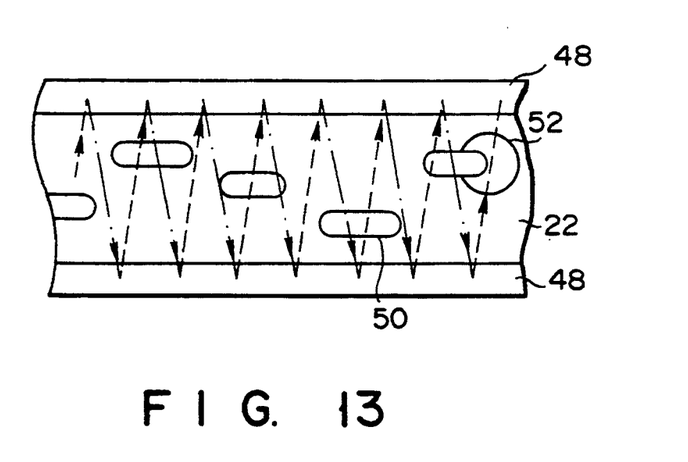
FIG. 13 shows a scanning state on a track.

FIGS. 11 through 14 show the third embodiment of the present invention. FIG. 11 schematically shows an optical system of a recording and reproducing apparatus of an optical recording medium according to the third embodiment of the present invention. FIG. 12 is a block diagram of the main part of the recording and reproducing apparatus of the optical recording medium. FIG. 13 shows a scanning state on a track. FIG. 14A is a waveform chart of a photodiode output obtained by scanning of FIG. 13, and FIG. 14B is a waveform chart of an actuator pulse for moving a laser diode. In this embodiment, the same portions as in the first and second embodiments described above are denoted by the same reference numerals and a detailed description thereof will be omitted to avoid redundancy.

Referring to FIG. 11, a laser diode 68 is movable by an actuator 70 in the direction of an arrow J. A light beam as incident light emitted by the laser diode 68 irradiates a desired track 22 of an optical disk through a collimator lens 14, a polarization beam splitter 16, a λ/4 plate 18, and an objective lens 20. Light reflected by the track 22 is directed to the polarization beam splitter 16 through the objective lens 20 and the λ/4 plate 18, separated from the incident light, and received by a photodiode 24.

Referring to FIG. 12, the signal received by the photodiode 24 is output to a guide track detector 72 and a pit portion detector 74. The guide track detector 72 detects a guide track 48 from a difference in intensity between light reflected by the track 22 and light reflected by a guide track 48. The pit portion detector 74 detects a recording pit 50 from a difference in intensity between light reflected by the track 22 and light reflected by the recording pit 50. Signals detected by the guide track and pit portion detectors 72 and 74 are sent to a counter 76 and used respectively as start and stop signals for the counter 76. The counter 76 performs counting based on a predetermined clock supplied from a clock generator 78. Namely, the counter 76 counts data of the distance between the guide track 48 and the pit 50.

Figure 14A:
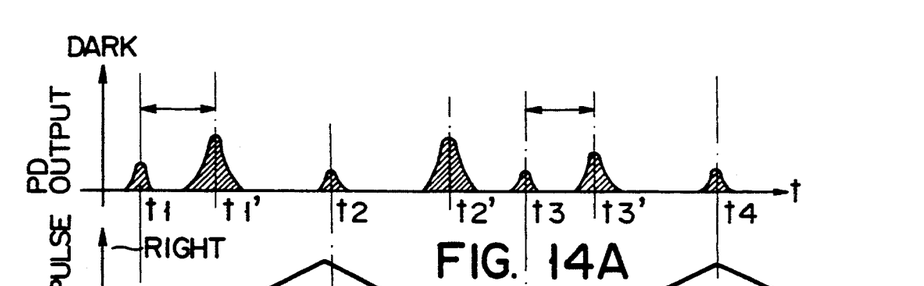
FIGS. 14A and 14B are waveform charts of a photodiode output obtained by scanning in FIG. 13 and a pulse of an actuator for moving a laser diode.

When the laser diode 68 is moved by the actuator 70 in the direction of an arrow J in FIG. 11, a corresponding spot 52 moves over the track 22 and the guide tracks 48 as indicated by a long and short dashed line and a broken line in FIG. 13. When a pulse is output from the actuator 70 as shown in, e.g., FIG. 14B, the output of the photodiode 24 becomes as shown in FIG. 14A along with the movement of the spot 52.

In other words, the outputs of the photodiode 24 at times t1, t2, t3, and t4 are the outputs from the guide tracks 48, and the outputs at times t1', t2', and t3' are the outputs representing the recording pits 50. Note that the position of a recording pit 50 is expressed by a distance between it and a guide track 48 on one side. In this embodiment, only the data obtained by movement in the broken line in FIG. 13 is used for this.

Therefore, when a distance between the points t1 and t1' and a distance between the points t3 and t3' are measured, the position of a recording pit 50 can be obtained. Namely, when the distance between the points t1 and t1' and the distance between the points t3 and t3' are counted by the counter 76, the position of the recording pit 50, i.e., data can be obtained.

Figure 14B:
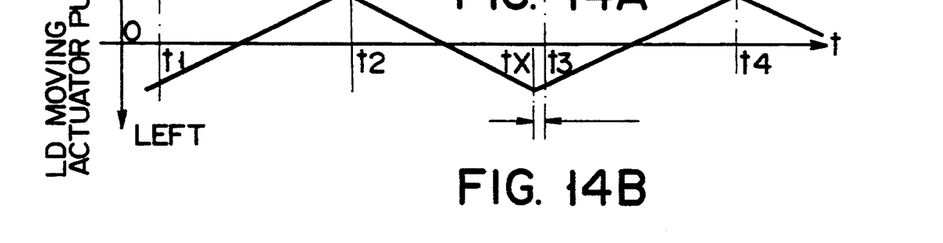

The actuator pulse corresponding to the maximum leftward movement in FIG. 14B is deviated from a photodiode output time point (tx to t3). Tracking servo (not shown) is performed by adjusting tracking by using this.

In order to move the spot 52 over the track 22 and the guide tracks 48 as shown in FIG. 13, the optical system is modified such that the output light from the laser diode 68 is reflected by a mirror or the like, in place of moving the laser diode 58, and the mirror is pivoted.

Figure 15A:
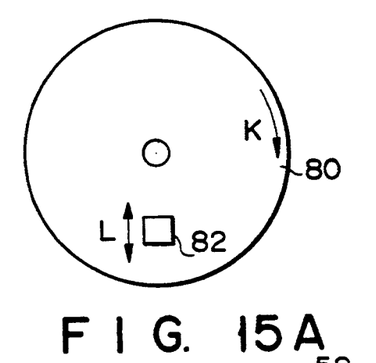
FIG. 15A shows the positional relationship between an optical recording medium and a pickup of the fourth embodiment of the present invention.
Figure 15B:
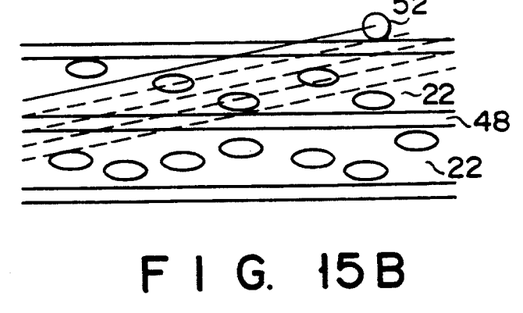
FIG. 15B shows the relationship between movements of a track of the optical recording medium of FIG. 15A and spots.
Figure 16:
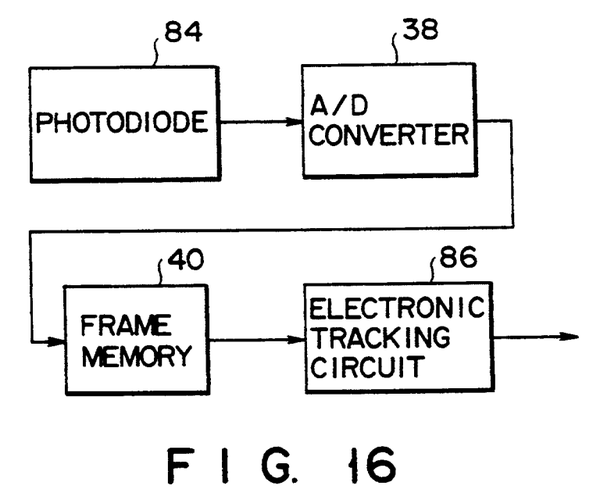
FIG. 16 is a block diagram of the main part of a recording and reproducing apparatus of the optical recording medium according to the fourth embodiment of the present invention.

FIGS. 15A and 15B, and FIG. 16 show the fourth embodiment of the present invention. An optical system is of a type used in a conventional optical disk apparatus. As shown in FIG. 15A, a pickup 82 including a laser diode is moved in the direction of an arrow L over an optical disk 80 as an optical recording medium rotating in the direction of an arrow K. The pickup 82 including a laser diode moving in the direction of the arrow L is moved without tracking for a distance corresponding to the eccentricity of the optical disk 80.

Then, a spot corresponding to this laser diode sequentially moves over the track 22 and the guide tracks 48 at a pitch ½ the spot diameter, as shown in FIG. 15B. Light reflected by the track 22 or a guide track 48 is received by a photodiode 84 shown in FIG. 16 and converted into an electrical signal.

The signal is digitized by an A/D converter 38 and stored in a frame memory 40. Then, the pickup 82 is moved as shown in FIG. 15A, and data of several tracks is stored in the frame memory 40 by the spot moving at the ½ pitch. This enables detection of the track position on the frame memory 40. As a result, recorded data can be detected while performing electronic tracking by the frame memory 40 and an electronic tracking circuit 86.

Figure 17:
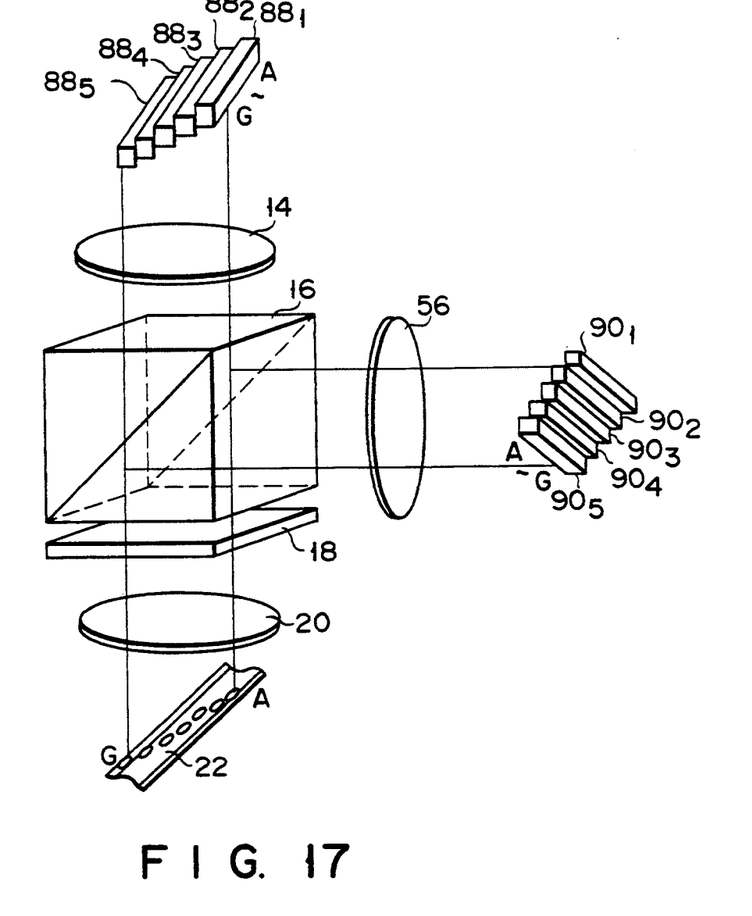
FIG. 17 schematically shows an optical system of a recording and reproducing apparatus of an optical recording medium according to the fifth embodiment of the present invention.

In FIG. 17, a plurality of laser diode arrays $88_1$, $88_2$, $88_3$, $88_4$, and $88_5$ each identical to the laser diode array 12 shown in FIG. 1 are arranged. The laser diode arrays $88_1$, $88_2$, $88_3$, $88_4$, and $88_5$ are arranged at such positions (heights) that, when they are turned on, they form corresponding images of the track 22 as focused points $92_1$, $92_2$, $92_3$, $92_4$, and $92_5$ shown in FIG. 18.

Figure 18:
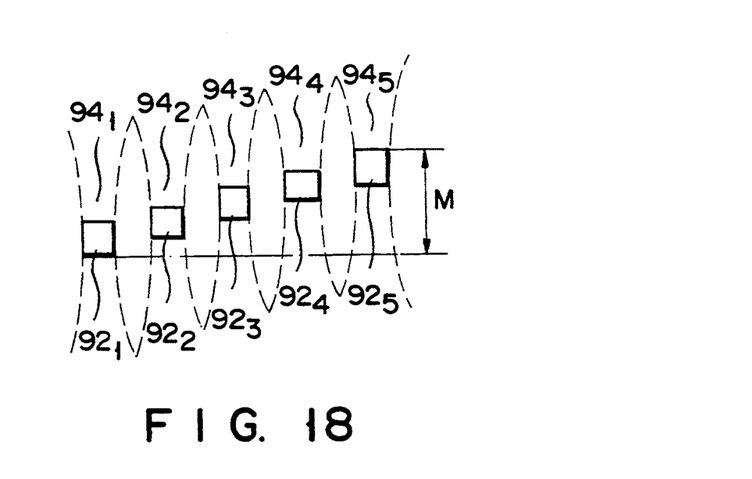
FIG. 18 shows in-focus states of light beams of a laser diode array in FIG. 17.

More specifically, the focused points $92_1$, $92_2$, $92_3$, $92_4$, and $92_5$ of light beams $94_1$, $94_2$, $94_3$, $94_4$, and $94_5$ emitted by the laser diode arrays $88_1$, $88_2$, $88_3$, $88_4$, and $88_5$ fall within a range indicated by an arrow M in FIG. 18. The range M is the allowable surface swing length of the disk having the track 22.

Photodiode arrays $90_1$, $90_2$, $90_3$, $90_4$, and $90_5$ are set to correspond to the laser diode arrays $88_1$, $88_2$, $88_3$, $88_4$, and $88_5$. When the optical system is configurated in this manner, focusing can be electronically performed by the frame memory 40 in the same manner as in the embodiments described above. As a result, the mechanical portion for performing tracking and focusing can be omitted, and the size and weight of the detection head can be reduced.

In the above embodiments, multi-value recording and reproduction by way of two-dimensional modulation of a track direction and a track width direction perpendicular to it are described. Three-dimensional modulation of multi-value recording and reproduction is possible if modulation recording is also performed in a pit depth direction (direction perpendicular to both the track direction and the track width direction), and recording density is greatly increased.

In the pit recording method with modulation in the two- or three-dimensional direction described above, regarding the track width direction, laser diodes corresponding in number to the steps of multi-value recording are arranged. The light beams from the laser diodes are focused on a medium track to form a pit, thereby performing recording. Regarding the pit depth direction, recording can also be performed by, e.g., changing the power of the laser diodes.

Furthermore, it is apparent that the present invention can use a material using an Al reflecting layer (CDROM), a Te-based material, a colorant-based material, a phase change material (write type), a photomagnetic material, a phase change material (reversible type), or the like as the recording material.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical recording medium comprising:
    a plurality of writing tracks;
    a plurality of guide tracks respectively formed between two of said plurality of writing tracks; and
    a plurality of pits formed in each of said plurality of writing tracks;
    said plurality of writing tracks having data written therein, said data being represented by distance between each of said plurality of pits and one of said plurality of guide tracks adjacent to the writing track in which said plurality of pits are formed.

2. The optical recording medium according to claim 1, wherein:
    said data represented by said distance, written in said plurality of writing tracks, is further represented by a distance between adjacent pits when viewed in at least one of a track length direction and a track width direction which is perpendicular to said track length direction; and
    said data represented by said distance, written in said plurality of writing tracks, has a principal pit dimension in at least one of said track length direction and said track width direction.

3. The optical recording medium according to claim 1, wherein said data represented by said distance, written in said plurality of writing tracks, is further represented by a pit depth.

* * * * *